(12) United States Patent
Faulkner et al.

(10) Patent No.: US 8,978,398 B2
(45) Date of Patent: Mar. 17, 2015

(54) METHOD AND APPARATUS FOR MEASURING EXPANSION VALVE DIAPHRAGM STROKE

(75) Inventors: Anthony W. Faulkner, Southfield, MI (US); Stephen Sinadinos, Commerce Township, MI (US)

(73) Assignee: DENSO International America, Inc., Southfield, MI (US)

( * ) Notice: Subject to any disclaimer, the term of this patent is extended or adjusted under 35 U.S.C. 154(b) by 1022 days.

(21) Appl. No.: 13/076,134

(22) Filed: Mar. 30, 2011

(65) Prior Publication Data

US 2012/0247129 A1 Oct. 4, 2012

(51) Int. Cl.
F25B 41/04 (2006.01)
F25B 41/06 (2006.01)
F16K 37/00 (2006.01)

(52) U.S. Cl.
CPC ........... F25B 41/062 (2013.01); F16K 37/0033 (2013.01); F16K 37/0041 (2013.01)
USPC ............................................. 62/131; 62/127

(58) Field of Classification Search
USPC ..................................................... 62/131, 127
See application file for complete search history.

(56) References Cited

U.S. PATENT DOCUMENTS 6,634,567 B2 10/2003 Hotta et al.

*Primary Examiner* — Cassey D Bauer
(74) *Attorney, Agent, or Firm* — Harness, Dickey & Pierce, P.L.C.

(57) ABSTRACT

An expansion valve assembly includes a housing that defines a passage through which a fluid flows. The assembly also includes a diaphragm that deflects according to a characteristic of the fluid and valve member that is operably coupled to the diaphragm to move within the passage between a first position and a second position due to deflection of the diaphragm to regulate flow of the fluid through the passage. A stroke is defined by a distance between the first and second positions of the valve member. Moreover, the assembly includes a stroke measuring device having a first member and a second member. The first member is operably coupled to the valve member to move relative to the second member due to movement of the valve member. The stroke measuring device is operable to detect the amount of relative movement of the first and second members to detect the stroke.

10 Claims, 4 Drawing Sheets

METHOD AND APPARATUS FOR MEASURING EXPANSION VALVE DIAPHRAGM STROKE

FIELD

The present disclosure relates to an expansion valve and, more particularly, relates to a method and apparatus for measuring expansion valve diaphragm stroke.

BACKGROUND

This section provides background information related to the present disclosure which is not necessarily prior art.

A cooling cycle, air conditioning cycle, or refrigeration cycle typically includes a compressor, a condenser, an expansion valve assembly, and an evaporator. The cycle also includes a plurality of conduits (e.g., tubes or hoses) that fluidly connect the compressor, condenser, expansion valve assembly, and evaporator. A refrigerant flows through the conduits and through the compressor, condenser, expansion valve assembly, and evaporator cyclically, changing temperature and pressure through the cycle. Moreover, air flows past the evaporator to be cooled and absorb heat from an area. This cooled air can be used to cool a space (e.g., a passenger compartment of a vehicle). Also, air flows past the condenser to reject the heat that was absorbed in the evaporator.

Typically, the expansion valve assembly includes a diaphragm that deflects due to pressure and/or temperature of the refrigerant (e.g., due to pressure/temperature of refrigerant in dome or bulb that is in fluid communication with the low pressure suction portion of the system). The expansion valve can also include a moveable valve member that regulates flow through the expansion valve assembly. The diaphragm is coupled to the valve member such that deflection of the diaphragm causes the valve member to move and allow modulation. The amount of movement of the valve member (and, thus, the amount of movement of the diaphragm) is called a stroke or stroke distance.

The following discloses an apparatus and method of detecting the stroke distance conveniently and accurately. The following also discloses a method of testing a refrigeration cycle, wherein the stroke distance can be detectably varied, and operating conditions of the cooling cycle can be detected for each detected stroke distance.

SUMMARY

This section provides a general summary of the disclosure, and is not a comprehensive disclosure of its full scope or all of its features.

An expansion valve assembly is disclosed that includes a housing that defines a passage through which a fluid flows. The assembly also includes a diaphragm that deflects according to a characteristic of the fluid and valve member that is operably coupled to the diaphragm to move within the passage between a first position and a second position due to deflection of the diaphragm to regulate flow of the fluid through the passage. A stroke is defined by a distance between the first and second positions of the valve member. Moreover, the assembly includes a stroke measuring device having a first member and a second member. The first member is operably coupled to the valve member to move relative to the second member due to movement of the valve member. The stroke measuring device is operable to detect the amount of relative movement of the first and second members to detect the stroke.

A method of testing a refrigeration cycle with an expansion valve assembly is also disclosed. The method includes providing the expansion valve assembly having a diaphragm, a housing with a passage, a valve member that is moveably disposed within the housing, and a stroke measuring device having a first and second member. The diaphragm is operable to deflect to cause movement of the valve member between a first position and a second position to change flow of a fluid through the passage. A stroke is defined by a distance between the first and second positions, and movement of the valve member also causes movement of the first member relative to the second member. The method also includes calibrating the valve member and calibrating the stroke measuring device when the valve member is calibrated. Moreover, the method includes performing a test in which the fluid flows through the refrigeration cycle, detecting an operating condition of the refrigeration cycle, and detecting an amount of movement of the first member relative to the second member to thereby detect the stroke.

Furthermore, a method of testing a refrigeration cycle with an expansion valve assembly is disclosed. The method includes providing the expansion valve assembly. The expansion valve assembly has a diaphragm, a housing with a passage and a seat, and a valve member that is moveably disposed within the passage between a first position and a second position. The valve member is seated against the seat when in the first position, and the valve member is separated at a stroke distance away from the seat when in the second position. The valve member is operably coupled to the diaphragm to move between the first and second positions due to deflection of the diaphragm. The expansion valve assembly also includes a stroke measuring device having a first and second member. The first member is operably coupled to the valve member to move with the valve member, the first member has a magnetic field, and the second member is operable to detect a change in the magnetic field due to movement of the first member relative to the second member to thereby detect the stroke distance. The method also includes calibrating the valve member by adjusting the valve member for a superheat condition, calibrating the stroke measuring device when the valve member is calibrated, and performing a test in which the fluid flows through the refrigeration cycle. Furthermore, the method includes detecting an operating condition of the refrigeration cycle, and detecting an amount of movement of the first member relative to the second member to thereby detect the stroke distance during the test.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
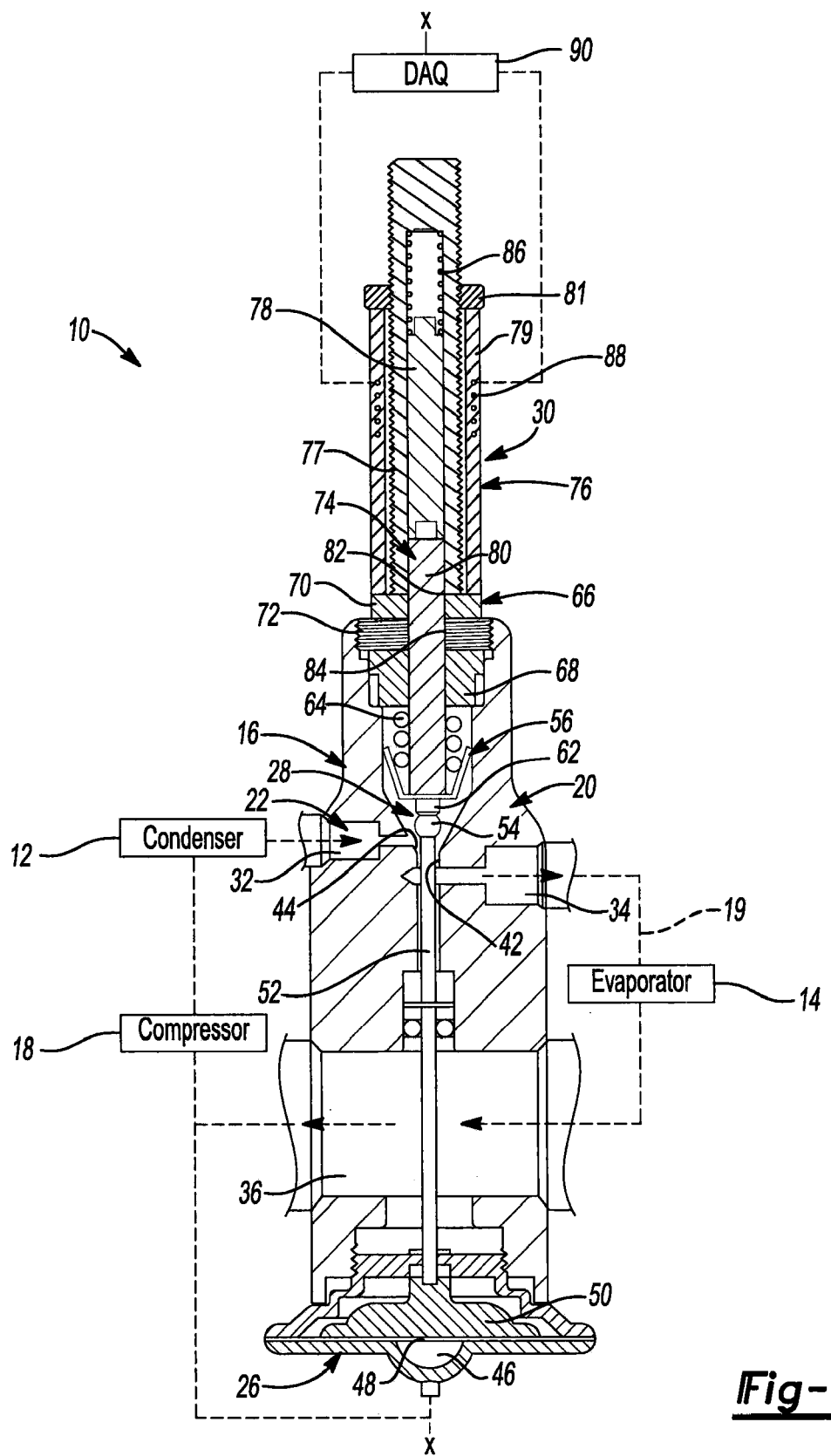
FIG. 1 is a schematic illustration of a refrigeration cycle with an expansion valve assembly shown in cross section.

Example embodiments of a refrigeration cycle 10 according to the present teachings will now be described more fully. As shown in FIG. 1, the refrigeration cycle 10 can generally include a condenser 12, an evaporator 14, an expansion valve assembly 16, a compressor 18, and a plurality of conduits 19 (e.g., pipes, tubes, etc.). The condenser 12, evaporator 14, compressor 18, and conduits 19 are shown schematically while the expansion valve assembly 16 is shown in section. Also, the conduits 19 are represented by individual broken lines. The condenser 12, evaporator 14, compressor 18, and conduits 19 can each be known components, and the expansion valve assembly 16 can include various features that will be described below.

In many ways, the refrigeration cycle 10 can operate similar to known refrigeration cycles. Thus, a refrigerant (e.g. HFO1234yf, R134a, etc.) can flow through the conduits 19 and through the compressor 18, condenser 12, expansion valve assembly 16, and evaporator 14 cyclically, changing temperature and pressure through the cycle 10. Moreover, air can flow past the evaporator 14 to be cooled, and this cooled air can be used to cool a space (e.g., a passenger compartment of a vehicle). Also, air can flow past the condenser 12 to be heated, and air can remove heat from the cycle 10. The refrigeration cycle 10 can be suitable for use in a vehicle (e.g., car, van, etc.), in a building, or in any other area.

As will be discussed in detail, the expansion valve assembly 16 (i.e., thermostatic expansion valve, TXV, TEV) can regulate flow of the refrigerant therethrough such that a desired amount of refrigerant is provided to the evaporator 14. Also, as will be discussed below, the expansion valve assembly 16 of the present disclosure can be useful in testing operation of the expansion valve assembly 16 and, thus, in testing operation of the refrigeration cycle 10. More specifically, the expansion valve assembly 16 can be used for changing the stroke of the expansion valve assembly 16, for detecting the distance of the set stroke, and for detecting resulting operating conditions of the cycle 10. As such, the expansion valve assembly 16 can be useful when testing a new refrigeration cycle 10 and/or a new expansion valve assembly 16 design.

Referring now to FIGS. 1-4, the expansion valve assembly 16 will be discussed in greater detail. As shown, the expansion valve assembly 16 can generally include a housing 20 that defines a plurality of passages 22 therethrough. The assembly 16 can also generally include a diaphragm assembly 26, a valve member 28, and a stroke measuring device 30.

The housing 20 can be generally cylindrical and made out of metal or other suitable material. The passages 22 defined in the housing 20 can include an inlet 32 (FIG. 1), an outlet 34 (FIG. 1), a plurality of through-passage 36, 38, 40 (FIGS. 1, 2, 4), and a longitudinal bore 42 (FIG. 1). The inlet 32, outlet 34, and through-passages 36, 38, 40 can each extend generally transverse (e.g., perpendicular) to the longitudinal axis X of the housing 20, and the bore 42 can be parallel and colinear with the longitudinal axis of the housing 20. The inlet 32 and outlet 34 can each extend only partially through the housing 20, and the respective axes of the inlet 32 and outlet 34 can be misaligned. The through-passages 36, 38, 40 can each extend entirely through the housing 20. The inlet 32 and outlet 34 can be fluidly connected to each other via the bore 42 as shown in FIG. 1. The bore 42 can also define a seat 44 shown in FIG. 1. The seat 44 can be substantially frusto-conic in shape.

The inlet 32 can be fluidly connected by a conduit 19 to the condenser 12. The outlet 34 can be fluidly connected to the evaporator 14. The through passage 36 can be fluidly connected at one end to the evaporator 14 and at the other end to the compressor 18.

The housing 20 can also include a cap 66 (adjustment device or end member) with an interior portion 68, an exterior portion 70, and a threaded portion 72. The threaded portion 72 can be moveably and threadably coupled to a longitudinal end of the housing 20. The interior portion 68 can be disposed within the housing 20, and the exterior portion 70 can remain outside the housing 20. The exterior portion 70 can include a plurality of flat surfaces, such as a hexagonal arrangement of flat surfaces suitable for grasping with a tool for threadably advancing the cap 66. Additionally, in some embodiments, a handle (not shown) can extend from the cap 66 for manually advancing the cap 66 relative to the housing 20.

Figure 2:
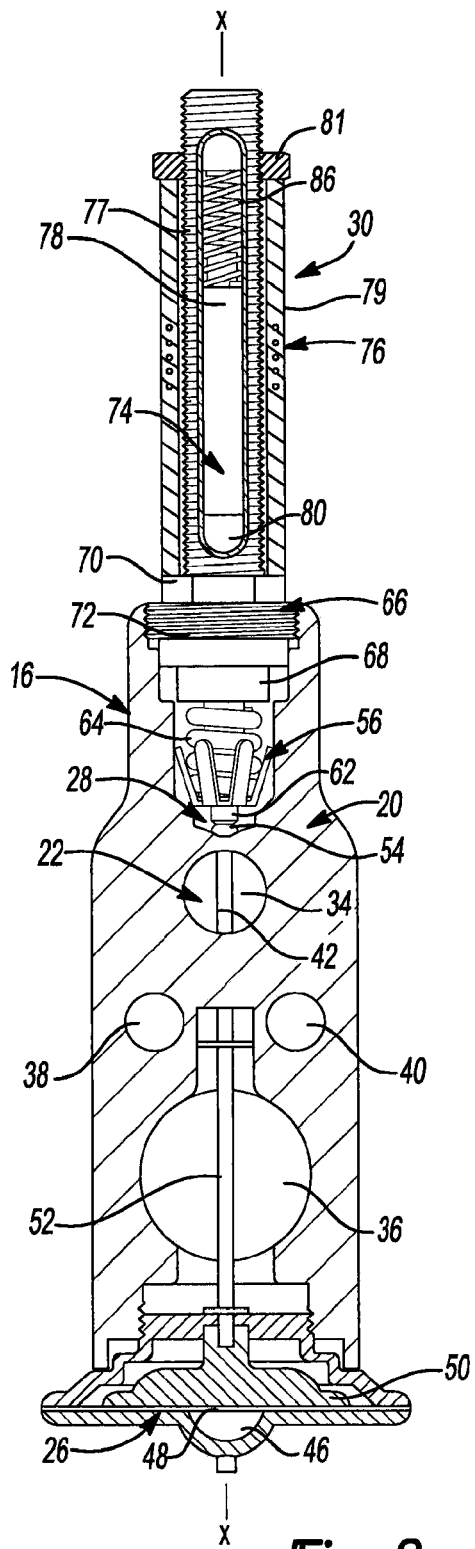
FIG. 2 is a sectional view of the expansion valve assembly of FIG. 1.

The diaphragm assembly 26 can be operably coupled to a longitudinal end of the housing 20, opposite the cap 66. As shown in FIGS. 1 and 2, the diaphragm assembly 26 can include a dome 46 that is threadably attached to the housing 20. The diaphragm assembly 26 can also include a thin, flexible diaphragm 48 and a pressure plate 50. The pressure plate 50 can abut against one side of the diaphragm 48 to move substantially in tandem with the diaphragm 48. The dome 46 can be in fluid communication with the compressor 18 or otherwise in communication with a low pressure side of the refrigeration cycle 10 as shown in FIG. 1, and the dome 46 can contain the refrigerant. Thus, characteristics (e.g., temperature and pressure) of the refrigerant in the dome 46 can change, which can cause the diaphragm 48 to deflect, which can, in turn, move the pressure plate 50 upwards and downwards along the axis X.

The valve member 28 can include an elongate rod 52 that is moveably disposed within the bore 42. The rod 52 can be operably coupled on one end to the pressure plate 50 such that the rod 52 moves due to deflection of the diaphragm 48. Specifically, the rod 52 can be fixed to the pressure plate 50 to move substantially in tandem with the diaphragm 48. The valve member 28 can also include a ball 54 (sealing member) that is fixed on the opposite end of the rod 52. The ball 54 can be disposed in the bore 42, between the inlet 32 and outlet 34, and can be large enough to selectively seat and substantially seal against the seat 44. Thus, as the diaphragm assembly 48 deflects generally downward along the axis X, the ball 54 can seat and seal against the seat 44 in a first position. As the diaphragm assembly 48 deflects upward along the axis X, the ball 54 can unseat and separate at a distance away from the seat 44 to a second position. (The ball 54 is shown in one example of a second position in FIG. 1.) The distance of travel of the ball 54 between its first (sealed) and second (unsealed) positions is defined as a stroke or stroke distance as will be discussed. This can be considered the stroke of the ball 54, the stroke of the valve member 28, and the stroke of the diaphragm assembly 48, since each of these components can be fixed together so as to move substantially in tandem.

It will be appreciated that when the ball 54 is in the second (unsealed) position, refrigerant can flow from the inlet 32, through the bore 42, and into the outlet 34. It will also be appreciated that when the ball 54 is in the first (sealed) position, refrigerant is limited from flowing in this manner.

It will additionally be appreciated that the stroke distance can be defined by any amount of movement of the ball 54 relative to the seat 44. For instance, the ball 54 can have a first position in which the ball 54 is separated at a distance from the seat 44, and the ball 54 can have a second position in which the ball 54 is separated at a larger distance from the seat 44. As such, the stroke distance can be defined as the distance between these first and second distances.

Figure 3:
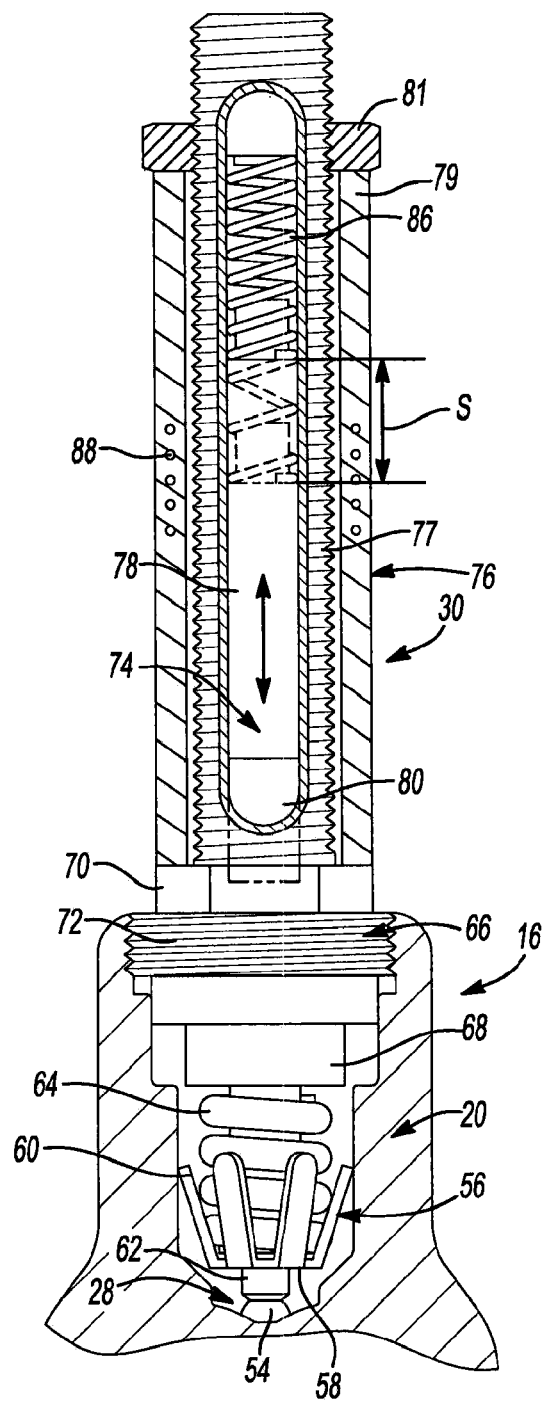
FIG. 3 is a detail, sectional view of a stroke measuring device of the expansion valve assembly of FIG. 1.
Figure 4:
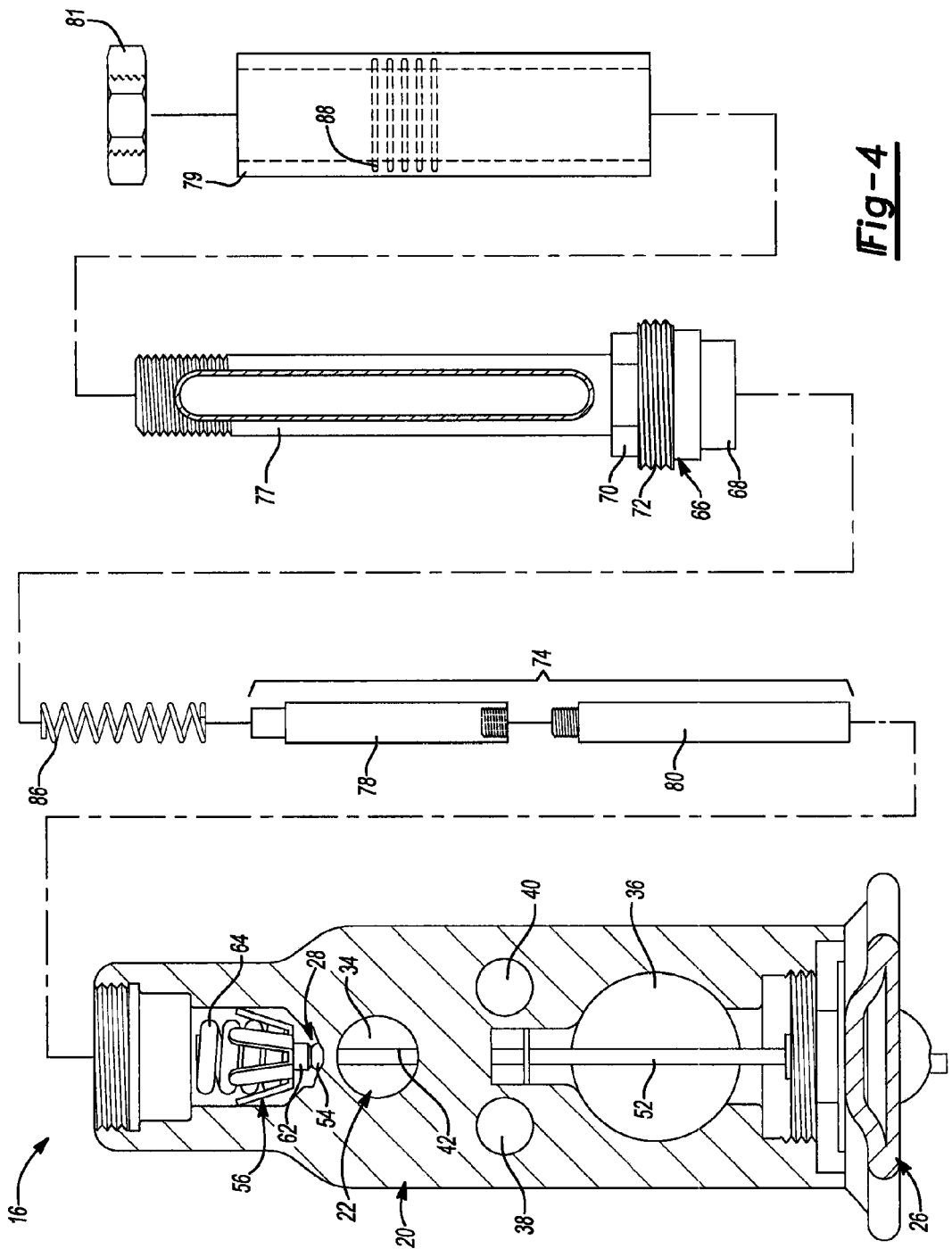
FIG. 4 is an exploded view of the expansion valve assembly of FIG. 1.

As best shown in FIG. 3, the valve member 28 can further include a crown 56 having a disc-shaped base 58 and a plurality of ribs 60 that extend upwardly from the base 58. A projection 62 can be included on the base 58 and can project in a direction opposite to the ribs 60. The projection 62 can be fixed to or can abut the ball 54 such that the crown 56 moves substantially in tandem with the ball 54.

The valve member 28 can additionally include a biasing member 64. The biasing member 64 can be a helical compression spring. One end of the biasing member 64 can abut against the base 58 of the crown 56, and the other end of the biasing member 64 can abut against the interior portion 68 of the cap 66. The biasing member 64 can be compressed so as to bias the ball 54 toward the seat 44 (i.e., toward the first position), and movement of the ball 54 away from the seat 44 (i.e., toward the second position) can occur against the biasing force from the biasing member 64.

With the ball 54 at its first position seated against the seat 44, the cap 66 can be threadably advanced relative to the housing 20, and the length of the biasing member 64 will be changed (either more or less compressed). Thus, the biasing load applied by the biasing member 64 with the ball 54 at its first position can be adjusted by advancing the cap 66. Since stroke of the valve member 28 (and also stroke of the diaphragm 48) is dependent on this biasing load, the stroke can be varied by threadably advancing the cap 66.

The stroke measuring device 30 can include a first member 74 and a second member 76. The first member 74 can include a first portion 78 and a second portion 80 (FIG. 4), which are both cylindrical and aligned end-to-end and threadably attached together. The second member 76 can include a hollow, tubular jacket 77 with a bore included therein. The second member 76 can also include an annular housing 79 and a lock nut 81. The housing 79 can slide over the jacket 77, and the lock nut 81 can threadably attach to the outer surface of the jacket 77 to thereby retain the housing 79 between the lock nut 81 and the cap 66. As such, the housing 79 of the second member 76 remains outside of the housing 20. The first member 74 can be moveably (e.g., slidably) disposed within the jacket 77. The jacket 77 can include an opening 82 at one end (FIG. 1) and can be closed on the opposite end. Also, the cap 66 can include a hole 84 that is aligned with the opening 82. Thus, as shown in FIG. 1, the first member 74 can extend from the jacket 77, through the cap 66, and into the bore 42 of the housing 20. The first member 74 can be operably coupled to the crown 56 of the valve member 28 such that the first member 74 moves due to movement of the valve member 28. Specifically, the first member 74 can abut against the base 58 of the crown 56. The biasing member 64 can also be loosely wound about the first member 74.

Moreover, the stroke measuring device 30 can include a biasing member 86, such as a helical compression spring, that is disposed between the first member 74 and the interior surface of the jacket 77. The biasing member 86 can apply a biasing load to the first member 74 to bias the first member 74 away from the jacket 77 and toward the crown 56 to thereby maintain contact with the crown 56.

Thus, as the ball 54 moves between its first and second positions, the first member 74 can move relative to the jacket 77 substantially in tandem with the ball 54. Thus, as shown in FIG. 3, the stroke of the ball 54 can be substantially equal to the distance S that the first member 74 moves relative to the jacket 77.

The second member 76 can further include a coil 88 (FIG. 1). The coil 88 can be embedded within or otherwise fixed to the housing 79. Also, the first portion 78 of the first member 74 can be magnetized (i.e., can have a magnetic field), and the coil 88 can be used to detect the amount of movement of the first member 74 relative to the coil 88, similar to a Hall effect sensor. In other words, movement of the first member 74 can vary the electrical signal of the coil 88.

The coil 88 can be electrically connected to a data acquisition device (DAQ) 90 as shown in FIG. 1. The DAQ 90 can include various features of a computer components, including hardware and software (e.g., processor, computerized memory, programmed logic, signal conditioner, etc.). The DAQ 90 can detect the variations in the electrical signal of the coil 88 due to the movement of the first member 74. This variation can be correlated to the distance of travel of the first member 74. Thus, the DAQ 90 can be used to gather and record the detected stroke distance S.

Thus, during operation of the refrigeration cycle 10, the diaphragm 48, valve member 28, and first member 74 can each move substantially in tandem relative to the housing 20 and coil 88. The coil 88 and DAQ 90 can detect the amount of relative movement of the first member 74 to thereby detect the stroke distance S. Accordingly, the stroke distance S can be detected conveniently and accurately.

Figure 5:
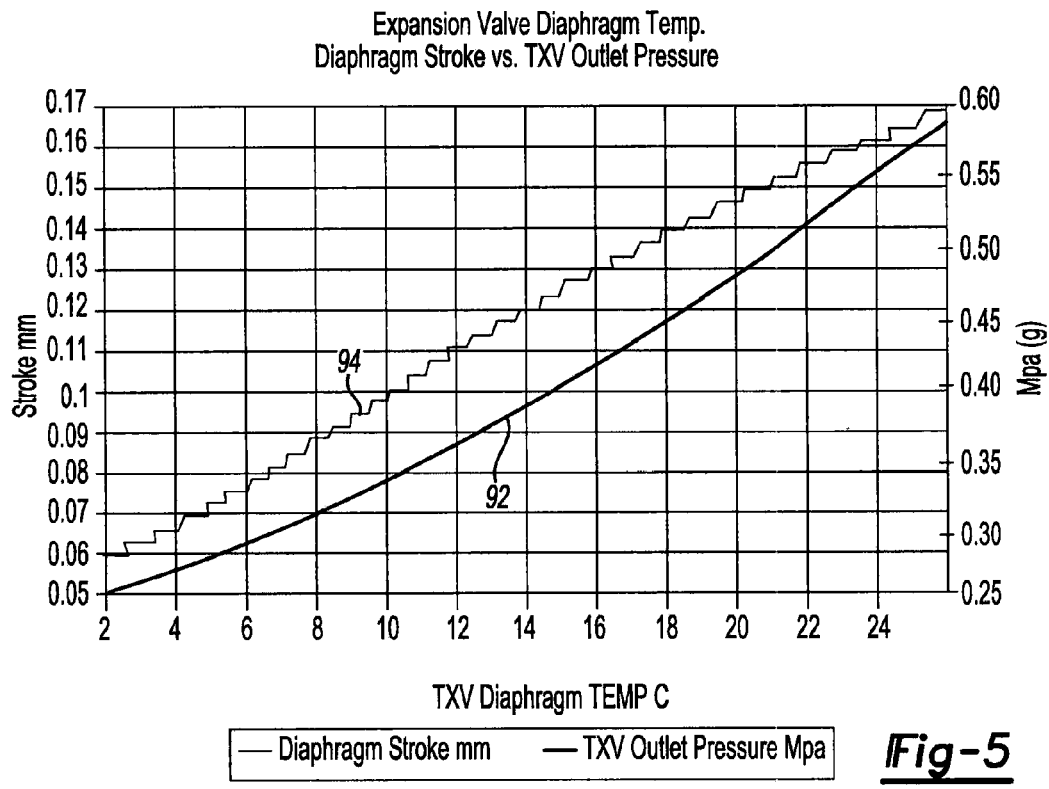
FIG. 5 is a graph showing detected characteristics of the refrigeration cycle using the expansion valve assembly of FIG. 1.

Moreover, for testing situations, the stroke distance S can be changed by threadably advancing the cap 66. This stroke distance S can be set by locking the cap 66 to the housing 20. In other words, the stroke distance S can be a controlled variable during testing. At each setting of the stroke distance S, the stroke measuring device 30 can detect the stroke distance S such that the stroke distance S becomes a known quantity. Accordingly, data can be gathered, similar to the data graphically displayed in FIG. 5. Specifically, as shown in FIG. 5, the pressure of the refrigerant exiting the thermal expansion valve assembly 16 (displayed on line 92) can be determined for a number of known stroke distances (displayed on line 94).

Figure 6:
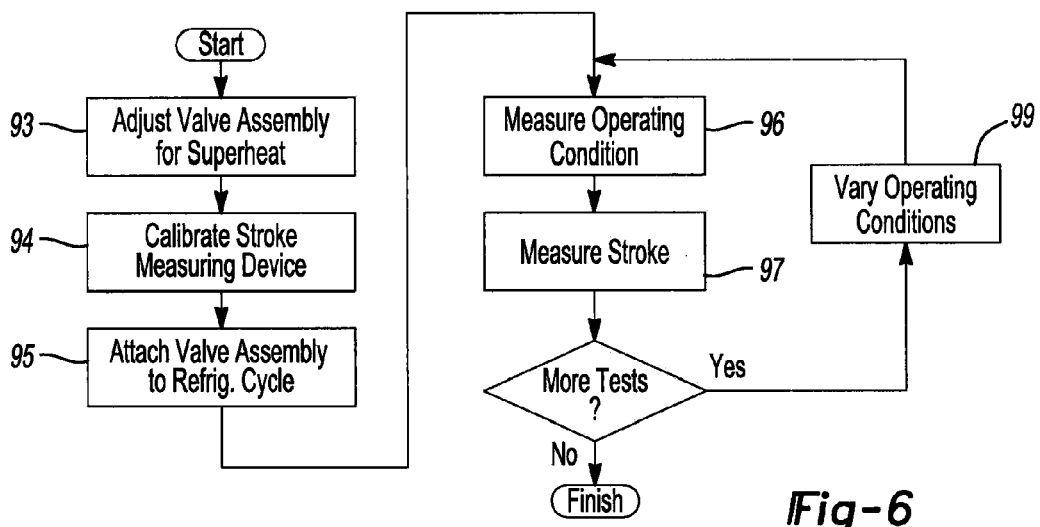
FIG. 6 is a flowchart illustrating a method of using the refrigeration cycle of FIG. 1.

Accordingly, various operating conditions of the refrigeration cycle can be tested, and the stroke distance S can be measured under each of these conditions. For instance, as shown, in FIG. 6, testing can start at 93, wherein the expansion valve assembly 16 is calibrated. Specifically, the expansion valve assembly 16 (i.e., the diaphragm 48 and valve member 28) can be calibrated by adjusting the assembly 16 for superheat conditions. This can be performed by threadably advancing the cap 66 at a known temperature (e.g., at approximately thirty-two degrees Fahrenheit (32° F.)) until the superheat condition is achieved. The assembly 16 can be calibrated separate from the rest of the refrigeration cycle 10.

Once the assembly 16 has been adjusted for superheat, in block 94, the stroke measuring device 30 can also be calibrated (i.e., zeroed). In other words, the relative position of the first member 74 and the coil 88 of the second member 76 can be established as the baseline position from which the stroke distance S will be subsequently measured.

Then, in block 95, the expansion valve assembly 16 can be operatively attached to the refrigeration cycle 10 as shown in FIG. 1, and testing of the cycle 10 can begin. The refrigeration cycle 10 can be run at a first set of operating conditions, which can be measured in block 96. For instance, ambient temperature, engine RPMs, blower speeds, etc. can be detected and measured in block 96.

Subsequently, the stroke distance S can be detected in block 97 in the manner discussed above. If there are more tests to run (block 98 answered affirmatively), then operating conditions (ambient temperature, RPMs, blower speeds) can be changed, and the testing loops back to block 96. Blocks 96, 97, 98, and 99 repeat in a loop until testing is completed (block 98 answered negatively).

Thus, the stroke distance S can be measured and correlated to any of the various operating conditions. It will be appreciated that the operating conditions measured in block 96 can be of any suitable type, such as the temperature and/or pressure of the refrigerant at any location within the cycle 10, the noise level of the refrigeration cycle 10, or any other condition. For instance, in the case of FIG. 5, the operating condition that is detected is the pressure of the refrigerant upon exit from the expansion valve assembly 16, and this is correlated to the stroke distance S as shown.

In some embodiments, testing can be conducted to determine whether the expansion valve assembly 16 is operating within predetermined specifications. The testing can also be conducted to determine at which point failure of the refrigeration cycle 10 occurs (e.g., breakage or wear of the dome 46). The testing can also be conducted to determine the point at which excessive refrigerant flow noise occurs, etc. Moreover, testing can be conducted to indicate superheat conditions, low refrigerant charge conditions, or TXV power dome charge conditions. In each case, the stroke distance S can be detected conveniently and accurately during testing.

Accordingly, this testing can provide valuable insight into the effect of the stroke distance S on the operation of the refrigeration cycle 10. The movement within the expansion valve assembly 16 can be monitored and adjusted for improving the operation of the refrigeration cycle 10. A desirable stroke distance S can be determined for the refrigeration cycle 10, and commercially available refrigeration cycles 10 can be provided with an expansion valve assembly set at this desirable stroke distance S.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of testing a stroke of an expansion valve assembly in a refrigerant cycle, the method comprising:
providing the expansion valve assembly having a data acquisition device, a diaphragm, a housing with a passage, a valve member that is moveably disposed within the housing, and a stroke measuring device having a first and second member, the diaphragm operable to deflect to cause movement of the valve member between a first position and a second position to change flow of a fluid through the passage, the stroke of the expansion valve assembly being defined by a distance between the first and second positions, movement of the valve member also causing movement of the first member of the stroke measuring device relative to the second member of the stroke measuring device;
calibrating the valve member using the data acquisition device;
calibrating the stroke measuring device when the valve member is calibrated;
performing a test in which the fluid flows through the refrigeration cycle;
detecting an operating condition of the refrigeration cycle; and
detecting an amount of movement of the first member of the expansion valve assembly relative to the second member of the expansion valve assembly to thereby detect the stroke using the data acquisition device.

2. The method of claim 1, wherein calibrating the valve member includes adjusting the valve member for a superheat condition.

3. The method of claim 1, wherein the operating condition is a noise level of the refrigeration cycle.

4. The method of claim 1, wherein the operating condition is at least one of a temperature and pressure of the fluid.

5. The method of claim 1, wherein calibrating the valve member includes varying a biasing load of a biasing member of the valve member toward the first position.

6. The method of claim 1, wherein the first member has a magnetic field, and wherein detecting the amount of movement of the first member relative to the second member includes detecting a change in the magnetic field with the second member.

7. The method of claim 1, wherein the passage includes a seat and the valve member includes a sealing member that seats against the seat when in the first position, the sealing member being separated from the seat at a distance equal to the stroke when in the second position.

8. A method of testing a refrigeration cycle with an expansion valve assembly comprising:
providing the expansion valve assembly having a data acquisition device, a diaphragm, a housing with a passage and a seat, and a valve member that is moveably disposed within the passage between a first position and a second position, the valve member seated against the seat when in the first position, the valve member separated at a stroke distance away from the seat when in the second position, the valve member being operably coupled to the diaphragm to move between the first and second positions due to deflection of the diaphragm, the expansion valve assembly also including a stroke measuring device having a first and second member, the first member operably coupled to the valve member to move with the valve member, the first member having a magnetic field, the second member operable to detect a change in the magnetic field due to movement of the first member relative to the second member to thereby detect the stroke distance;
calibrating the valve member using the data acquisition device by adjusting the valve member for a superheat condition;
calibrating the stroke measuring device when the valve member is calibrated;
performing a test in which the fluid flows through the refrigeration cycle;
detecting an operating condition of the refrigeration cycle; and
detecting an amount of movement of the first member relative to the second member to thereby detect the stroke distance using the data acquisition device during the test.

9. The method of claim 8, wherein the operating condition is at least one of a noise level of the refrigeration cycle, a temperature of the fluid, and a pressure of the fluid.

10. The method of claim 8, wherein calibrating the valve member includes varying a biasing load of a biasing member of the valve member toward the first position.

\* \* \* \* \*